United States Patent
Thind

(10) Patent No.: US 8,457,796 B2
(45) Date of Patent: Jun. 4, 2013

(54) PREDICTIVE CONDITIONING IN OCCUPANCY ZONES

(76) Inventor: Deepinder Singh Thind, Mankato, MN (US)

( * ) Notice: Subject to any disclaimer, the term of this patent is extended or adjusted under 35 U.S.C. 154(b) by 119 days.

(21) Appl. No.: 12/721,698

(22) Filed: Mar. 11, 2010

(65) Prior Publication Data

US 2010/0235004 A1 Sep. 16, 2010

Related U.S. Application Data

(60) Provisional application No. 61/159,088, filed on Mar. 11, 2009.

(51) Int. Cl.
*G06F 19/00* (2006.01)

(52) U.S. Cl.
USPC ............................ 700/276; 236/47; 340/501

(58) Field of Classification Search
USPC ....... 700/276, 277, 278; 236/47, 57; 340/501, 340/521, 522
See application file for complete search history.

(56) References Cited

U.S. PATENT DOCUMENTS

| | | | |
|---|---|---|---|
| 4,205,381 A | 5/1980 | Games et al. | |
| 5,170,935 A | 12/1992 | Federspiel | |
| 5,555,512 A * | 9/1996 | Imai et al. | 702/127 |
| 5,924,486 A * | 7/1999 | Ehlers et al. | 165/238 |
| 6,078,253 A * | 6/2000 | Fowler | 340/501 |
| 6,216,956 B1 * | 4/2001 | Ehlers et al. | 236/47 |
| 6,536,675 B1 | 3/2003 | Pesko et al. | |
| 7,113,086 B2 * | 9/2006 | Shorrock | 340/521 |
| 7,148,796 B2 * | 12/2006 | Joy et al. | 340/521 |
| 7,216,021 B2 * | 5/2007 | Matsubara et al. | 700/295 |
| RE40,437 E | 7/2008 | Rosen | |
| 7,502,768 B2 * | 3/2009 | Ahmed et al. | 706/21 |
| 7,565,227 B2 * | 7/2009 | Richard et al. | 700/291 |
| 7,813,822 B1 * | 10/2010 | Hoffberg | 700/94 |
| 8,125,884 B1 * | 2/2012 | Li et al. | 370/203 |
| 2010/0025483 A1 | 2/2010 | Hoeynck et al. | |

* cited by examiner

Primary Examiner — Kidest Bahta
(74) Attorney, Agent, or Firm — Ash Tankha; Lipton, Weinberger & Husick

(57) ABSTRACT

A method and system for predictively controlling environmental conditions of multiple occupancy zones in an occupancy space are provided. Occupancy and environmental conditions of each of the occupancy zones are detected and identified. The detected occupancy is stored in an occupancy database. Patterns of occupancy of each of the occupancy zones are determined using the occupancy database. Future occupancy of the occupancy zones is predicted based on the occupancy patterns of the occupancy zones. The environmental conditions of the occupancy zones are controlled based on the detected occupancy and/or the predicted future occupancy. The environmental conditions of the occupancy zones in the occupancy space are thereby predictively controlled by simultaneously incorporating an occupant's desired settings, existing and historical temperature data within the occupancy space, and weather data. The predicted occupancy can be combined with demand response signal and energy tier rates to make optimal conditioning decisions.

17 Claims, 14 Drawing Sheets

ADVANCED SETUP

| ROOM# | X POS | Y POS | TEMP OFFSET | OFFSET TEMP |
|---|---|---|---|---|
| 1 | 6 | 8 | 4 | 77 |
| 2 | 26 | 7 | 6 | 79 |
| 3 | 42 | 7 | -1 | 72 |
| 4 | 42 | 18 | 0 | 73 |
| 5 | 42 | 34 | -2 | 71 |
| 6 | 26 | 34 | 0 | 73 |
| 7 | 9 | 38 | 1 | 74 |
| 8 | 9 | 25 | 0 | 73 |
| 9 | 23 | 20 | 0 | 73 |
| 10 | 56 | 56 | 0 | 73 |
| 11 | 65 | 65 | 0 | 73 |
| 12 | 65 | 65 | 0 | 73 |
| 13 | 96 | 96 | 0 | 73 |

PLOT ROOMS ON PLAN | RESET OFFSETS

CURRENT SETPOINT 73

TEMPERATURE SETTINGS

LOW — HIGH

COMFORT — ECONOMY

MODE: HEATING

OF ROOMS: 9

DATE: 23-JUL-2009

TARIFF (C/KWH) 8

☑ ADVANCED SETUP

HOUSE DIM 9 BY 44 FEET

FIG. 11

PREDICTIVE CONDITIONING IN OCCUPANCY ZONES

CROSS REFERENCE TO RELATED APPLICATIONS

This application claims the benefit of the following patent applications:
1. Provisional patent application No. 61/159,088 titled "Predictive Conditioning In Occupancy Zones", filed on Mar. 11, 2009 in the United States Patent and Trademark Office.
2. Non-provisional patent application Ser. No. 12/274,344 titled "Determination Of Class, Attributes And Identity Of An Occupant", filed on Nov. 19, 2008 in the United States Patent and Trademark Office.

The specifications of the above referenced patent applications are incorporated herein by reference in their entirety.

BACKGROUND

The method and system disclosed herein, in general, relates to heating, ventilating and air conditioning (HVAC) systems. More particularly, the method and system disclosed herein relates to predictively controlling environmental conditions of multiple occupancy zones in an occupancy space.

A private residential or small commercial building typically uses a single thermostat for controlling the temperature of the building space. The temperature may be sensed and controlled in areas within the building space that are least likely to be occupied. If the entire building space is conditioned irrespective of actual occupancy by the occupants, conditioning of unoccupied parts of the building space leads to inefficient use of energy. Moreover, the building space is conditioned according to the temperature around a single thermostat, resulting in uneven conditioning of the building space. The uneven conditioning of the building space is exacerbated by leakage of heat from peripheral areas of the building. The temperature set on the single thermostat may not be comfortable for occupants occupying different areas of the building space and therefore there may be a need to frequently reset the temperature, which results in consumption of additional energy. Generally, programmable thermostats currently available are designed to adjust the temperature of the building space based on settings programmed by a user. The settings take effect at various times of the day to cater to different temperatures and comfort levels of the occupants. Furthermore, the programmable thermostats that are available require the user to be familiar with programming configurations to program the thermostat based on the comfort levels. The programming configurations may be complex.

Furthermore, if the occupants return to their private residence after spending a day outside, the residential building space may not be conditioned upon the arrival of the occupants. The occupants must first occupy the building space and then wait for the building space to be conditioned. While the occupants wait for the building space to be conditioned, they may have to bear uncomfortable environmental conditions, for example, extreme heat or extreme cold. Therefore, there is a need for predicting occupancy of the building space and conditioning the building space prior to occupancy by the occupants.

Hence, there is long felt but unresolved need for a user friendly HVAC system that attains maximum comfort levels and efficiently utilizes energy resources by predictively controlling environmental conditions of multiple occupancy zones in an occupancy space.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the above stated need for a user friendly heating, ventilation, and air conditioning (HVAC) system that attains maximum comfort levels and efficiently utilizes energy resources by predictively controlling environmental conditions of multiple occupancy zones in an occupancy space. Occupancy and environmental conditions of the occupancy zones are detected and identified. The detected occupancy of each of the occupancy zones is stored in an occupancy database. Patterns of occupancy of each of the occupancy zones over a predetermined duration, for example, over a day or a week, are determined using, for example, the historical data and detected occupancy stored in the occupancy database. Future occupancy of the occupancy zones is predicted based on the determined patterns of occupancy of each of the occupancy zones. The environmental conditions of the occupancy zones in the occupancy space are controlled based on the detected occupancy and the predicted future occupancy of the occupancy zones. One or more occupancy and environmental sensor motes and one or more actuators are provided in each of the occupancy zones for detecting and predictively controlling environmental conditions in each of the occupancy zones. The controlled environmental conditions are displayed on a graphical user interface, for example, by overlaying temperature heat maps and occupancy maps on a floor plan of the occupancy space.

In an embodiment, the control of the environmental conditions in the occupancy zones in the occupancy space is determined based on class and attributes of an occupant in each of the occupancy zones. An infrared image of the occupant in each of the occupancy zones is captured. The infrared image information of the captured image is digitized to obtain a thermal signature of the occupant. The thermal signature of the occupant is compared with thermal signatures of multiple occupants stored in a thermal signature database for determining the class and attributes of the occupant. The environmental conditions of the occupancy zones are predictively controlled based on one or more of the detected occupancy, the predicted future occupancy, and the determined class and attributes of the occupant. The environmental conditions of the occupancy zones in the occupancy space are thereby predictively controlled by simultaneously incorporating an occupant's desired settings, existing and historical temperature data within the occupancy space, and weather data.

The environmental conditions of the occupancy space are controlled based on multiple present and forecast, internal and external environmental conditions and the predicted future occupancy in the occupancy zones. The forecast external environmental conditions comprise, for example, regional weather forecasts for short and long durations of time. In an embodiment, multiple control parameters are combined to predictively control the environmental conditions in each of the occupancy zones. The predicted occupancy can be combined with, for example, demand response signal and energy tier rates to make optimal conditioning decisions.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIG. 11 exemplarily illustrates a graphical user interface displaying temperatures of occupancy zones and setup options.

DETAILED DESCRIPTION OF THE INVENTION

Figure 1:
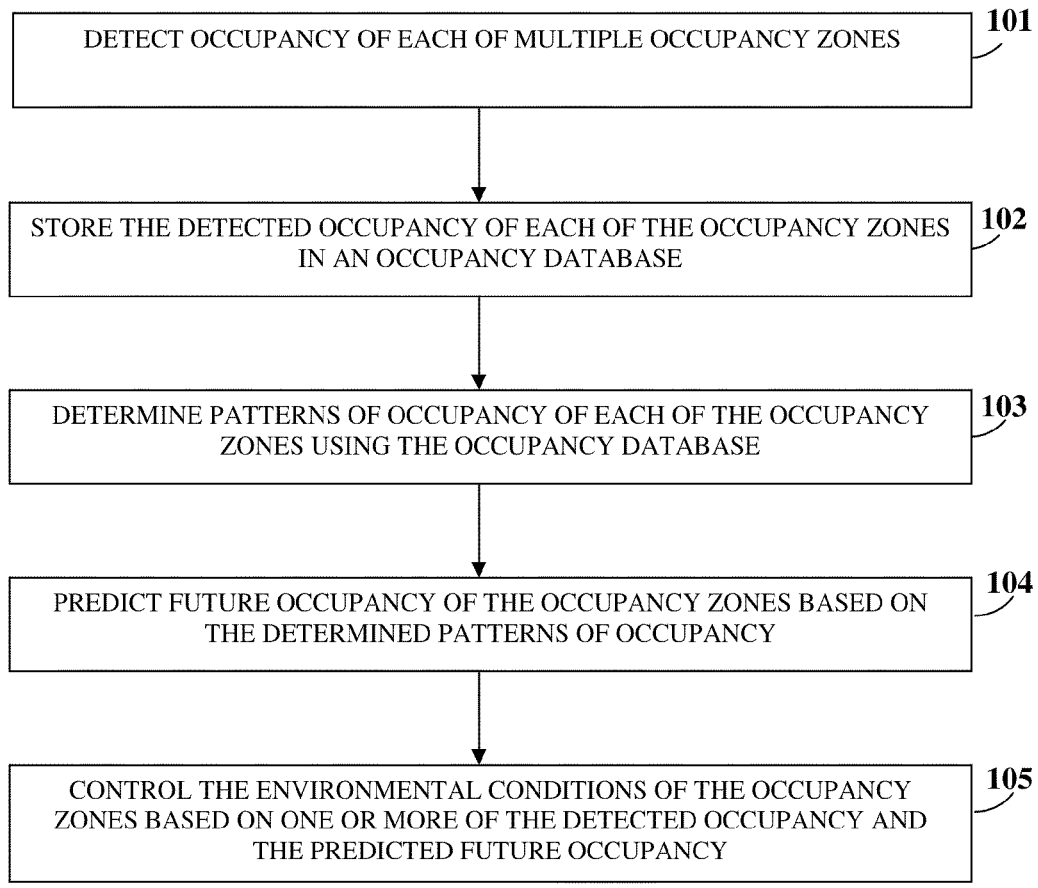
FIG. 1 illustrates a method for predictively controlling environmental conditions of multiple occupancy zones in an occupancy space.

FIG. 1 illustrates a method for predictively controlling environmental conditions of multiple occupancy zones in an occupancy space. As used herein, "occupancy space" refers to an enclosed space that may be occupied by animate or inanimate occupants. A single occupancy space may be divided into two or more occupancy zones. For example, if a building space comprising multiple rooms is considered an occupancy space, each of the rooms in the building may be considered an occupancy zone. In another example, a large hall may be considered an occupancy space and multiple areas thereof may be considered as occupancy zones. The occupancy spaces and the occupancy zones may be enclosed indoor spaces or physically unbounded outdoor spaces.

Also, as used herein, "occupant class" refers to the general class of an occupant, for example, whether the occupant belongs to the animate class, inanimate class, human class, or non-human class. Furthermore, as used herein, "attributes of an occupant" further defines the class of the occupant, for example, whether the occupant belonging to the animate class is an adult human, a child, a non-human animal, the number of such occupants and any other attribute of the occupant that may need to be determined. Further, as used herein an "occupant" refers to an animate or an inanimate object in an occupancy space. For example, an occupant may be a person, an animal, or a piece of furniture or equipment in the occupancy space.

Occupancy of each of the occupancy zones are detected 101. The occupancy of the occupancy zones is detected to determine presence of an occupant in the occupancy space. The detected occupancy of each of the occupancy zones at any given time is stored 102 in an occupancy database. The detected occupancy of each of the occupancy zones stored in the occupancy database is used as historical data for correlating and determining 103 patterns of occupancy in each of the occupancy zones over a predetermined duration, for example, over a day or a week. The patterns of occupancy are generally consistent with the living patterns of the occupants. Future occupancy of the occupancy zones is predicted 104 based on the determined patterns of occupancy of each of the occupancy zones. The environmental conditions of the occupancy zones in the occupancy space are controlled 105 based on one or more of the detected occupancy and the predicted future occupancy of the occupancy zones.

Environmental conditions of each of the occupancy zones are also detected. The environmental conditions close to the occupant may be detected as the occupant moves within the occupancy zones of the occupancy space. The environmental conditions of the occupancy zones, for example, comprise temperature, humidity, etc. The detected environmental conditions are correlated with preferred environmental conditions of the occupant. The preferred environmental conditions, for example, comprise predefined comfort levels of the occupant. Environmental conditions outside of the occupancy space may also be detected. The external environmental conditions comprise, for example, air temperature, wind speed, solar radiation, etc. The external environmental conditions may also be predicted using weather forecasts.

Future occupancy of the occupancy zones is predicted based on the historical patterns of detected occupancy stored in the occupancy database. The future occupancy is predicted by correlation with the records in the occupancy database and predictive control is exercised by a set of predefined rules. The set of predefined rules is herein also referred to as a predictive control algorithm. The predictive control algorithm computes future occupancy based on the detected occupancy over a predetermined duration.

Detecting the immediate occupancy in the occupancy zones and then conditioning the occupancy zones to an optimal level requires time and causes discomfort to the occupants while the occupancy zones are being conditioned to the optimal level. The predictive control algorithm predicts the occupancy patterns and proactively conditions the occupancy zones to set points or optimal levels, prior to occupancy of the occupancy zones.

Consider for example, an occupant Jane who wakes up in the morning at 6 a.m. and goes into the kitchen at 7 a.m. to prepare breakfast at her residence. Jane leaves the house at 7.30 a.m. after breakfast. At night the kitchen is not conditioned since Jane only occupies a bedroom. If Jane's presence is detected in the kitchen, when she prepares breakfast at 7 a.m., and then the system starts conditioning the kitchen, the kitchen temperature would be suboptimal while Jane cooks and eats. The kitchen would reach the optimal level by around 7.30 a.m. at which time Jane would be ready to leave the house. If however, the kitchen is proactively conditioned at 6.30 a.m. based on the predictive control algorithm, Jane would occupy a kitchen which is already at the set point or optimal level.

Conditioning of occupancy zones based on occupancy saves energy by not conditioning the unoccupied occupancy zones. The predictive control algorithm predicts which of the occupancy zones is likely to be occupied and conditions the occupancy zones proactively. Predictive conditioning therefore prevents any discomfort to the occupant. Even though different occupancy zones in the occupancy space are not conditioned, the occupants always enter the occupancy zones that are predictively conditioned in anticipation.

In an embodiment, random short term occupancies over a predetermined duration, for example, over a day can be averaged out by averaging or normalizing the occupancy patterns over several days. This eliminates subsequent or daily predictive conditioning of occupancy zones that are seldom visited or visited once or twice a week. In another embodiment, the occupancy patterns are averaged over one or more weeks. This enables the living patterns of the occupants to be distinguished on weekdays compared to weekends. Normalizing the occupancy patterns over several predetermined durations enables a robust predictive control, which is consistent with the living patterns of the occupants over a day or a week.

In an embodiment, the class and attributes of an occupant in each of the occupancy zones in the occupancy space are determined for determining the control of the environmental conditions in the occupancy zones. Consider an example of an occupant detected in one of the occupancy zones. The class and attributes of the occupant are determined to determine whether the occupant is a human or a non-human occupant. If the occupant is non-human, the environmental conditions of the occupancy zones may be minimal or not controlled. If the occupant is human, the environmental conditions of the occupancy zones may be controlled. To determine the class and attributes of the occupant, an infrared (IR) image of the occupant in each of the occupancy zones in the occupancy space is captured. Infrared image information of the captured image is digitized to obtain a thermal signature of the occupant, the details of which are disclosed in the co-pending application Ser. No. 12/274,344, which is incorporated herein by reference in its entirety. As used herein, "thermal signature" refers to the digitized version of the infrared emission pattern of an occupant in an occupancy space when the occupant is infrared imaged using, for example, infrared sensors. The thermal signature of the occupant is compared with thermal signatures of multiple occupants stored in a thermal signature database for determining the class and the attributes of the occupant.

The environmental conditions of the occupancy zones are predictively controlled based on one or more of the detected occupancy and environmental conditions of the occupancy space, the predicted future occupancy, the determined class and attributes of the occupant, and the present and forecast, internal and external environmental conditions. For example, the weather forecast data can also be incorporated to derive optimal conditioning levels. The system disclosed herein can access weather forecasts for the next few days and use that information to regulate the environmental conditions in the occupancy zones not just on a diurnal basis but also on a longer weekly pattern. For example, if the forecast suggests that the temperature is going to drop in the night to a temperature lower than average, the system adjusts the set point temperature to a higher value in few of the rooms. This would offset the greater heat loss during the night making the occupancy space more comfortable.

The environmental conditions in the occupancy zones are also controlled based on the predefined comfort levels of the occupant. The environmental conditions are controlled prior to the occupancy of the occupancy zones by the occupant based on the predicted future occupancy. In an embodiment, the environmental conditions of the occupancy zones are manually controlled using a graphical user interface (GUI) located either proximally or remotely with respect to the occupancy zones. For example, the GUI for controlling one of the occupancy zones may be located within the occupancy zone for enabling the occupant to control the environmental conditions. Alternatively, the GUI may be located within a control room outside the occupancy zone, thereby enabling a console operator to control the environmental conditions.

In another embodiment, the environmental conditions of the remotely located occupancy zones are controlled using a wireless device. The environmental conditions are controlled by issuing control instructions. The issued control instructions are executed by multiple actuators provided in each of the occupancy zones. The environmental conditions are also controlled by controlling air flow using multiple vents in the occupancy zones. The environmental conditions of areas proximal to the occupant are controlled for providing an optimum comfort level.

Energy consumption is reduced by controlling the environmental conditions of only the areas proximal to the occupant and not controlling areas remote to the occupant. Furthermore, environmental conditions other than the temperature in the occupancy zones are also controlled, thereby providing the occupant with comfortable environmental conditions while reducing the change in temperature required to achieve the set point level. The reduction in the change in temperature reduces total energy consumed. Energy is also saved by accounting for external environmental conditions and proactively controlling the internal environmental conditions.

To illustrate the reduction in energy consumption, consider the following example. The energy needed to heat or cool an occupancy space is dependent on the temperature difference between the inside of the occupancy space and the outside. If the outside temperature is 40° F. and the inside temperature is set to 72° F., then the occupancy space needs to be heated by 32° F. If the difference of 32° F. is to be maintained for one day, the total heating may be referred to as 32 heating degree days.

Consider, for example, a family living in a house having four occupancy zones. The occupancy zones comprise two bedrooms, a kitchen, and a living room. The family uses the kitchen and the living room in the evening and then retires to the bedrooms at night. In the evening, the kitchen and living room is heated to 72° F. while they are occupied and the bedrooms are cooled to around 62° F. When the family retires to the bedrooms, the bedrooms are heated to 72° F. and the kitchen and living room are allowed to cool to 62° F. In this example, the average temperature of the house is given by:

$$[(\text{number of occupancy zones at 72 F}*2)+(\text{number of occupancy zones at 62 F}*2)]/\text{total number of occupancy zones in the house}$$

$$=[(2*72)+(2*62)]/4=68° \text{F}.$$

If the average occupancy space temperature were 68° F. instead of 72° F., then the occupancy space needs to be heated by just 28° F. Hence, the occupancy space will be supplied less heat. The actual gain may be computed using the calculation 32−28/32*100=12.5%. Hence, in this case, by lowering the temperature by just 4° F., the efficiency of heating is increased by 12.5%, which results in a fairly significant cut in energy bills. There is no change in the comfort level of the occupants since the occupancy zones occupied by them are set to the optimal level of 72° F.

The actual relationships between temperature differences and heat loads may be more complex than illustrated above. However, even higher efficiency gains are computed using the complex actual relationships. The simplified relationship illustrated above serves as a fairly accurate first order approximation of the efficiency gain. The gain may also vary with location, climate, and the actual average occupancy space temperature. The example furnished above is typical of a temperate climatic region in North America in winter.

Figure 2:
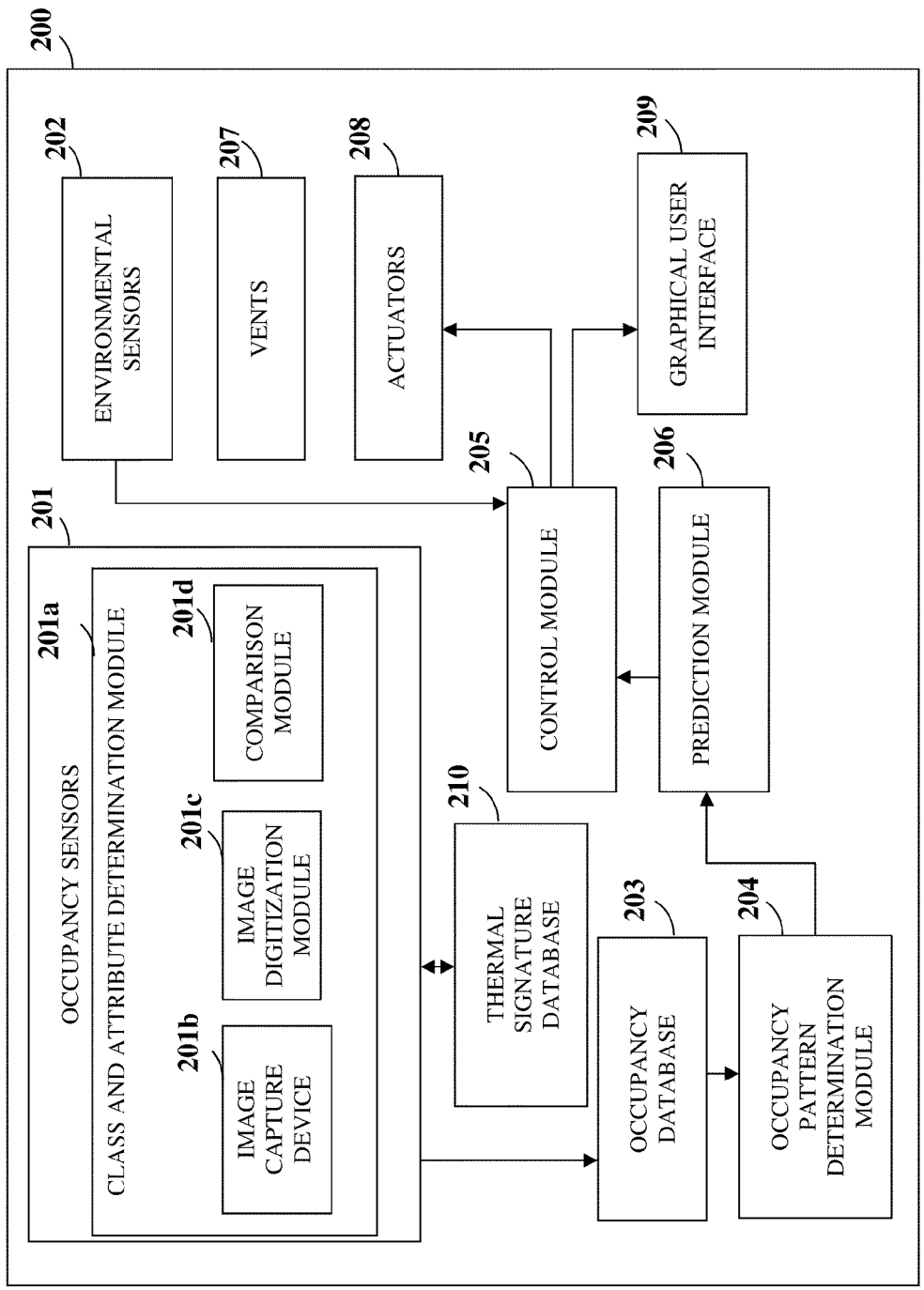
FIG. 2 illustrates a system for predictively controlling environmental conditions of multiple occupancy zones in an occupancy space.

FIG. 2 illustrates a system 200 for predictively controlling environmental conditions of multiple occupancy zones in an occupancy space. The system 200 disclosed herein comprises multiple distributed occupancy sensors 201, multiple distributed environmental sensors 202, an occupancy pattern determination module 204, a prediction module 206, a graphical user interface (GUI) 209, a control module 205, an occupancy database 203, multiple vents 207, and multiple actuators 208. The occupancy sensors 201 and the environmental sensors 202 are, for example, deployed within the occupancy space as distributed sensor nodes or "motes" in a network of sensors.

The occupancy sensors 201 detect occupancy of each of the occupancy zones. The environmental sensors 202 detect the environmental conditions of the occupancy zones in the occupancy space. The environmental sensors 202 may also detect environmental conditions outside the occupancy space. To detect the environmental conditions outside the occupancy space, one or more environmental sensors 202 may be positioned outside the occupancy space. The external environmental conditions comprise, for example, air temperature, wind speed, solar radiation, etc. The external environmental conditions are also predicted using weather forecasts. The occupancy database 203 stores the detected occupancy of each of the occupancy zones as historical data. The occupancy sensors 201 and the environmental sensors 202 are, for example, battery operated and communicate wirelessly with the control module 205.

The occupancy sensors 201 are based on one or more of charged coupled device (CCD) sensors and complimentary metal oxide semiconductor sensors that detect occupancy using specific infrared signatures and digital image processing techniques. The occupancy sensors 201 comprise a class and attribute determination module 201a. The class and attribute determination module 201a determines class and attributes of an occupant in each of the occupancy zones in the occupancy space for enabling the control module 205 to determine the control of the environmental conditions of the occupancy zones. The class and attribute determination module 201a comprises an image capture device 201b, an image digitization module 201c, and a comparison module 201d. The image capture device 201b captures an infrared image of the occupant in each of the occupancy zones in the occupancy space. The image capture device 201b uses, for example, charge coupled devices (CCDs), complimentary metal oxide semiconductor (CMOS) sensors, microbolometers or pyroelectric devices for capturing the image. The image digitization module 201c digitizes infrared image information of the captured image to obtain a thermal signature of the occupant. The comparison module 201d compares the thermal signature of the occupant with thermal signatures of multiple occupants stored in a thermal signature database 210 for determining the class and the attributes of the occupant.

The occupancy pattern determination module 204 determines patterns of occupancy of each of the occupancy zones over a predetermined duration using the historical data stored in the occupancy database 203. The prediction module 206 predicts future occupancy of the occupancy zones based on the determined patterns of occupancy of each of the occupancy zones, as disclosed in the detailed description of FIG. 1. The control module 205 predictively controls the environmental conditions of the occupancy zones in the occupancy space based on one or more of the detected occupancy, the predicted future occupancy, the determined class and attributes of the occupant, and the detected internal and external environmental conditions. Control parameters, for example, a demand response signal and different energy tier rates from the utilities can be combined with the occupancy patterns to make optimal conditioning decisions.

The control module 205 issues control instructions executed by the actuators 208. The actuators 208 are used to control a device such as a furnace or an air conditioner. The actuators 208 are also, for example, used to control individual heaters, radiators, split/window air conditioning units, etc. The vents 207 are mechanical devices with actuators 208 for controlling air flow in each of the occupancy zones through the vents 207. The vents 207 are, for example, modular drop-in vents that help control the environmental conditions of the occupancy zones by controlling air flow. The vents 207 enable granular control of the environmental conditions of each of the occupancy zones. The vents 207 and the actuators 208 may be battery operated and may communicate wirelessly with the control module 205. The control module 205 predictively controls the vents 207 through the actuators 208. The vents 207 and the actuators 208 may utilize forced air heating and cooling techniques. For example, in case of a central forced air system, the actuator 208 controls a central system, for example, the furnace or the air conditioning units, while the vents 207 redirect and control the flow of air into the occupancy zones. Air may be forced over heating or cooling coils and then distributed throughout the occupancy zones via a duct system (not shown). The heating or cooling coils may be heated or cooled hydronically or by using a heat exchanger, a fuel burner, or electricity.

The GUI 209 enables controlling of the environmental conditions of the occupancy zones in either a proximal location or a remote location. The GUI 209 provides one or more configurable and selectable modes of operation, for example, an economy mode and a comfort mode for the control module 205. The GUI 209 displays the controlled environmental conditions. The GUI 209 comprises, for example, a touch screen based interface for providing a user, for example, the occupant or a console operator, easy control of the environmental conditions of the occupancy zones. The GUI 209 may also be a web based interface or an application running on smart phones and pen-enabled computer tablets (tablet PCs). A user may control the environmental conditions of the occupancy space using the web based GUI 209 over a network, for example, the internet. The GUI 209 displaying temperature heat maps and occupancy maps overlaid on a floor plan of an occupancy space is exemplarily illustrated in FIG. 10. A GUI 209 displaying temperatures of occupancy zones and setup options available to a user is exemplarily illustrated in FIG. 11. The system 200 disclosed herein may be retrofitted into an existing occupancy space, for example, a residential or commercial building.

Figure 3:
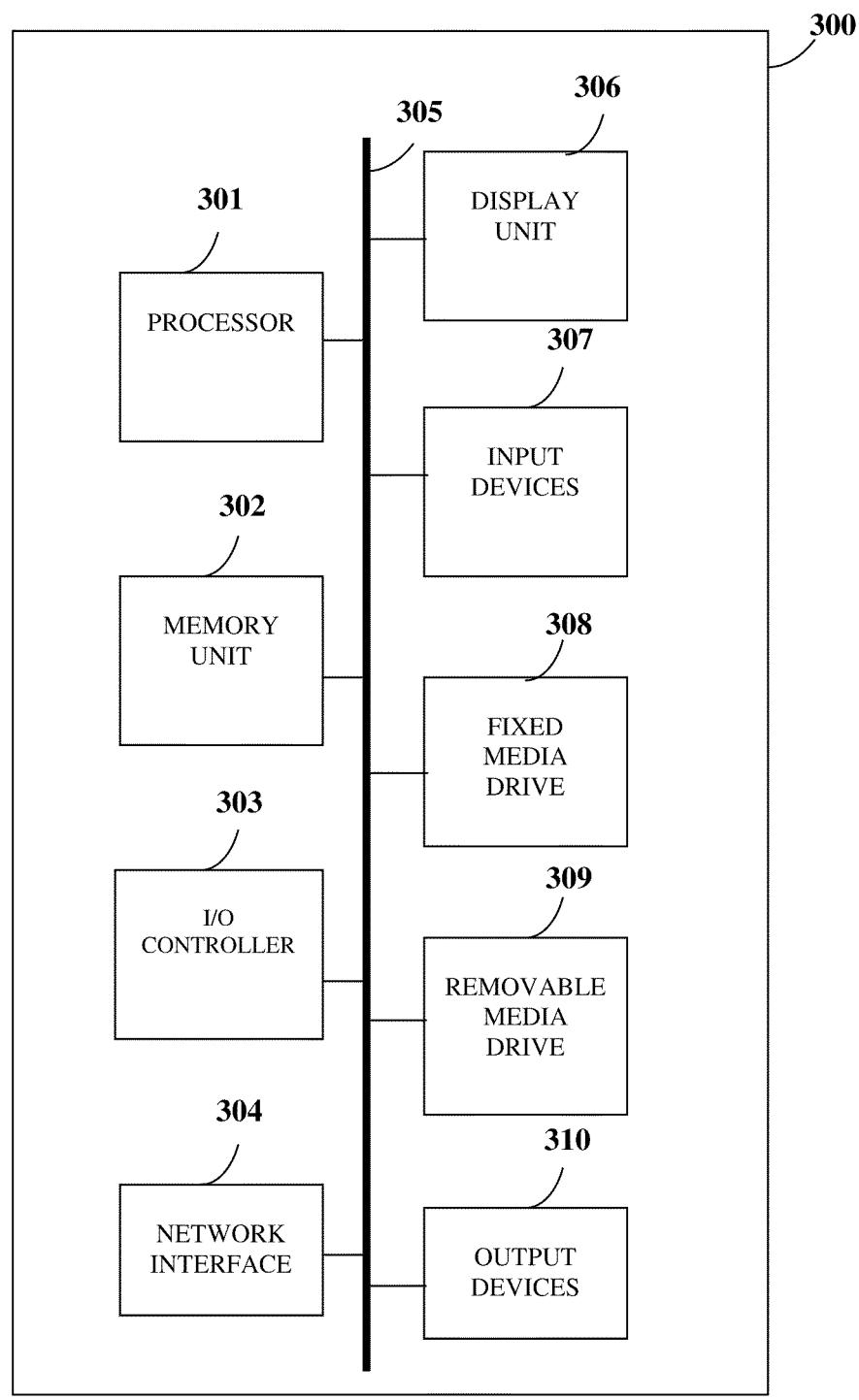
FIG. 3 exemplarily illustrates the architecture of a computer system used for predictively controlling environmental conditions of multiple occupancy zones in an occupancy space.

FIG. 3 exemplarily illustrates the architecture of a computer system 300 used for predictively controlling environmental conditions of multiple occupancy zones in an occupancy space. The control module 205, the occupancy database 203, the occupancy pattern determination module 204, the prediction module 206, and the GUI 209 are typically installed on a portable, mobile or stationary computing device, which employs the architecture of the computer system 300 exemplarily illustrated in FIG. 3. In an embodiment, the computer system 300 may employ an alternative architecture, for example, the computer system 300 may employ a dedicated or specialized processor or microcontroller, in lieu of a conventional processor 301, configured for controlling environmental conditions in an occupancy space.

The control module 205, the occupancy sensors 201, and the environmental sensors 202 communicate with each other via a network. The network is, for example, a wireless network, a wired network, a local area network (LAN), etc. The computer system 300 comprises, for example, a processor 301, a memory unit 302 for storing programs and data, an input/output (I/O) controller 303, a network interface 304, a network bus 305, a display unit 306, input devices 307, a fixed media drive 308, a removable media drive 309, and output devices 310, for example, a printer, etc.

The processor 301 is an electronic circuit that can execute computer programs. The memory unit 302 is used for storing programs, applications, and data. For example, the control module 205 is stored on the memory unit 302 of the computer system 300. The memory unit 302 is, for example, a random access memory (RAM) or another type of dynamic storage device that stores information and instructions for execution by the processor 301. The memory unit 302 also stores temporary variables and other intermediate information used during execution of the instructions by the processor 301. The computer system 300 further comprises a read only memory (ROM) or another type of static storage device that stores static information and instructions for the processor 301. The network interface 304 enables connection of the computer system 300 to the network. The I/O controller 303 controls the input and output actions performed by the user. The network bus 305 permits communication between the modules, for example, 201c, 201d, 203, 204, 205, 206, and 209 of the system 200 disclosed herein.

The display unit 306 displays results of the control module 205 to the user. The input devices 307 are used for inputting data into the computer system 300. The input devices 307 are, for example, a keyboard such as an alphanumeric keyboard, a joystick, a mouse, a touch pad, a light pen, etc. The computer system 300 further comprises a fixed media drive 308 and a removable media drive 309 for receiving removable media.

Computer applications and programs are used for operating the computer system 300. The programs are loaded onto the fixed media drive 308 and into the memory unit 302 of the computer system 300 via the removable media drive 309. In an embodiment, the computer applications and programs may be loaded directly through the network. Computer applications and programs are executed by double clicking a related icon displayed on the display unit 306 using one of the input devices 307. The user interacts with the computer system 300 using the GUI 209 of the display unit 306.

The computer system 300 employs operating systems for performing multiple tasks. An operating system is responsible for the management and coordination of activities and the sharing of the resources of the computer system 300. The operating system further manages security of the computer system 300, peripheral devices connected to the computer system 300, and network connections. The operating system employed on the computer system 300 recognizes, for example, inputs provided by the user using one of the input devices 307, the output display, files and directories stored locally on the fixed media drive 308, etc. The operating system on the computer system 300 executes different programs initiated by the user using the processor 301. Instructions for executing the control module 205 functions are retrieved by the processor 301 from the program memory in the form of signals. Location of the instructions in the program memory is determined by a program counter (PC). The program counter stores a number that identifies the current position in the program of the control module 205.

The instructions fetched by the processor 301 from the program memory after being processed are decoded. After processing and decoding, the processor 301 executes the instructions. For example, the occupancy pattern determination module 204 defines instructions for determining patterns of occupancy of each of the occupancy zones over a predetermined duration. The prediction module 206 defines instructions for predicting future occupancy of the occupancy zones based on the determined patterns of occupancy of each of the occupancy zones. The image digitization module 201c defines instructions for digitizing infrared image information of an infrared image of the occupant captured by the image capture device 201b to obtain a thermal signature of the occupant. The comparison module 201d defines instructions for comparing the thermal signature of the occupant with thermal signatures of multiple occupants stored in the thermal signature database 210 for determining the class and attributes of the occupant. The control module 205 defines instructions for predictively controlling the environmental conditions of the occupancy zones based on one or more of the detected occupancy and the predicted future occupancy, the determined class and attributes of the occupant, the internal and external environmental conditions, etc. which are stored in the program memory or received from a remote server.

The processor 301 retrieves the instructions defined by the occupancy pattern determination module 204, the prediction module 206, the control module 205, the image digitization module 201c, and the comparison module 201d, and executes the instructions.

Figure 4:
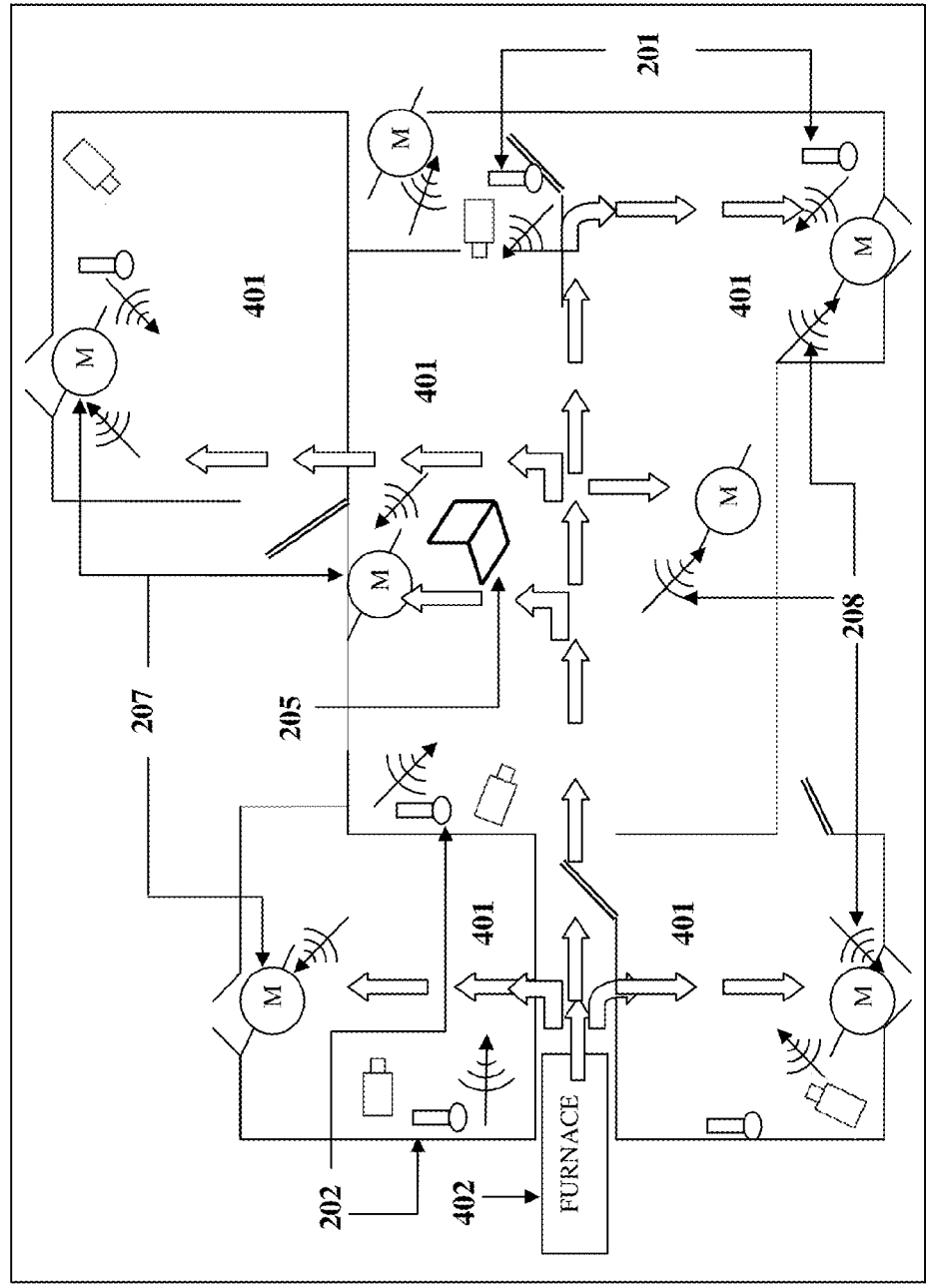
FIG. 4 exemplarily illustrates deployment of the components of the system for predictively controlling environmental conditions of multiple occupancy zones.

FIG. 4 exemplarily illustrates deployment of the components of the system 200 for predictively controlling environmental conditions of multiple occupancy zones 401. The components assist and enable control of the environmental conditions of the occupancy zones 401. The components comprise, for example, a furnace 402, the vents 207, the actuators 208, the occupancy sensors 201, and the environmental sensors 202. The occupancy sensors 201 and environmental sensors 202 in the occupancy zones 401 detect occupancy and environmental conditions of the occupancy zones 401 respectively.

The control module 205 modifies the environmental conditions to suit the comfort levels of the occupant. The control module 205 issues control instructions to the vents 207 and the actuators 208. The actuators 208 execute the control of the furnace 402. The actuators 208 also execute control of the air conditioner and the individual heaters. The vents 207 regulate airflow in the occupancy zones 401. The control instructions issued by the control module 205 carry information regarding environmental conditions of the occupied occupancy zones 401 and the occupancy zones 401 whose occupancy is predicted. The control instructions control the environmental conditions of only those occupancy zones 401 occupied by human occupants and the occupancy zones 401 predicted to be occupied, thereby minimizing energy consumption by avoiding conditioning of unoccupied spaces.

Consider, for example, an occupancy space as illustrated in FIG. 4. Different occupancy zones 401, for example, different rooms of the occupancy space, for example, a house, may be occupied by multiple occupants. The occupancy sensors 201 detect the presence of the occupants in the occupancy zones 401. The environmental sensors 202 detect the environmental conditions of the occupancy zones 401. The control module 205 receives the detected occupancy information from the occupancy sensors 201 and detected environmental conditions information from the environmental sensors 202. The control module 205 processes the received occupancy information and the received environmental conditions information. The control module 205 determines the difference between the detected environmental conditions and optimum environmental conditions preferred by the occupants. Further, the control module 205 issues control instructions to the actuators 208 to control the environmental conditions of the occupancy zones 401. The actuators 208 execute the control instructions and regulate air flow in and out of the vents 207.

The furnace 402 is used to provide heat to the occupancy zones 401. Flow of heat into the occupancy zones 401 is illustrated using block arrows in FIG. 4. The occupancy information from the occupancy sensors 201 and environmental conditions information from the environmental sensors 202 are used to predict future occupancy of the occupancy zones 401 and control the environmental conditions of the occupancy zones 401.

Figure 5A:
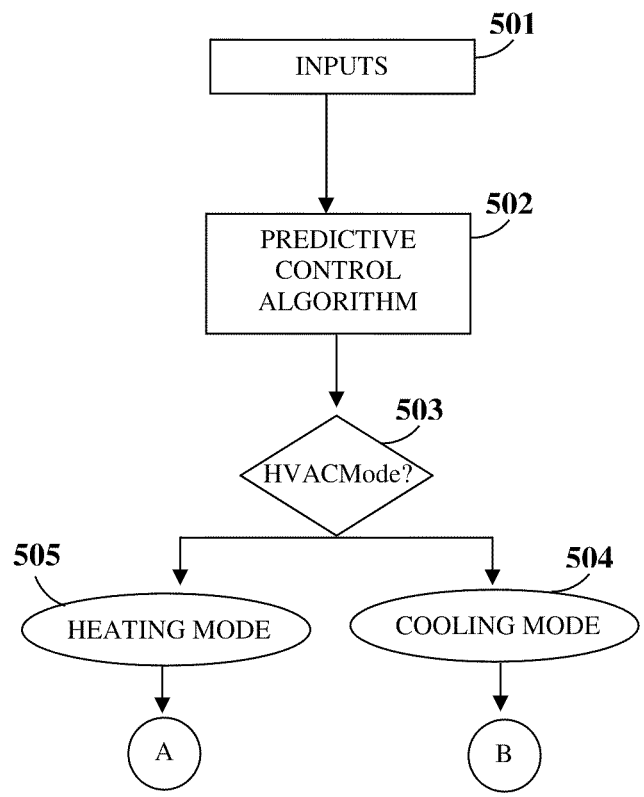
FIGS. 5A-5C exemplarily illustrate a flowchart comprising the steps of predictively controlling environmental conditions in multiple occupancy zones in an occupancy space.
Figure 5B:
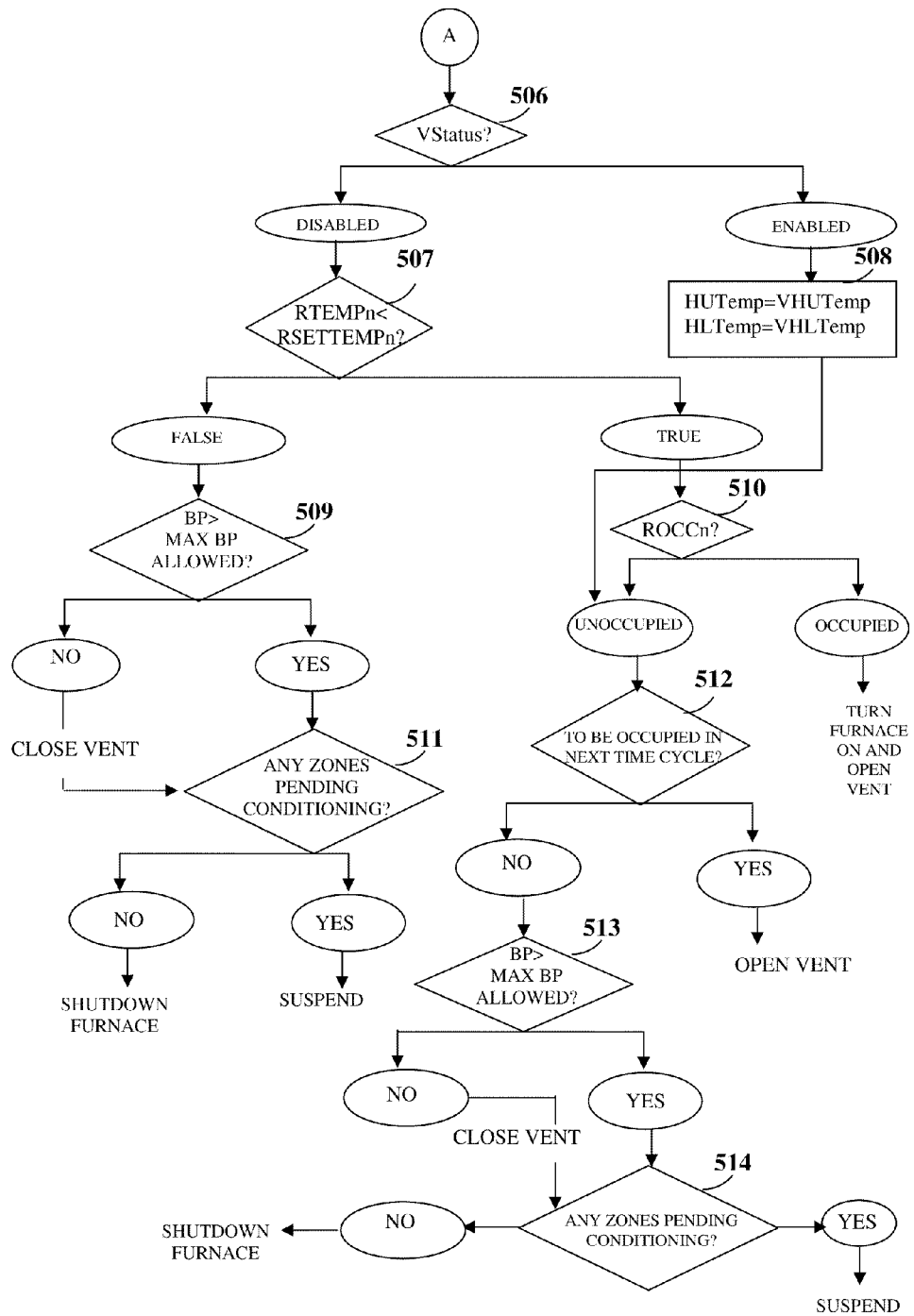
Figure 5C:
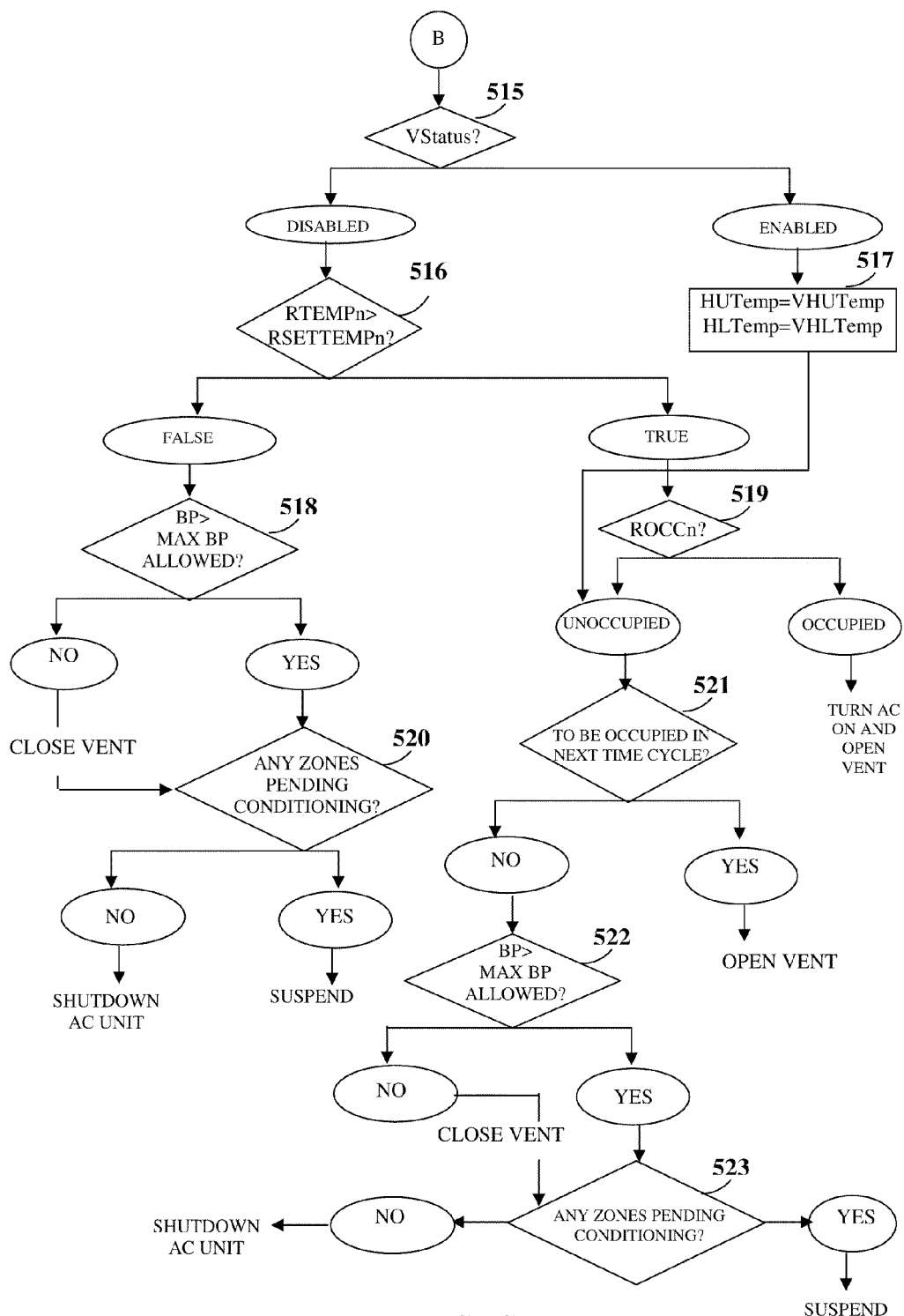
Figure 5D:
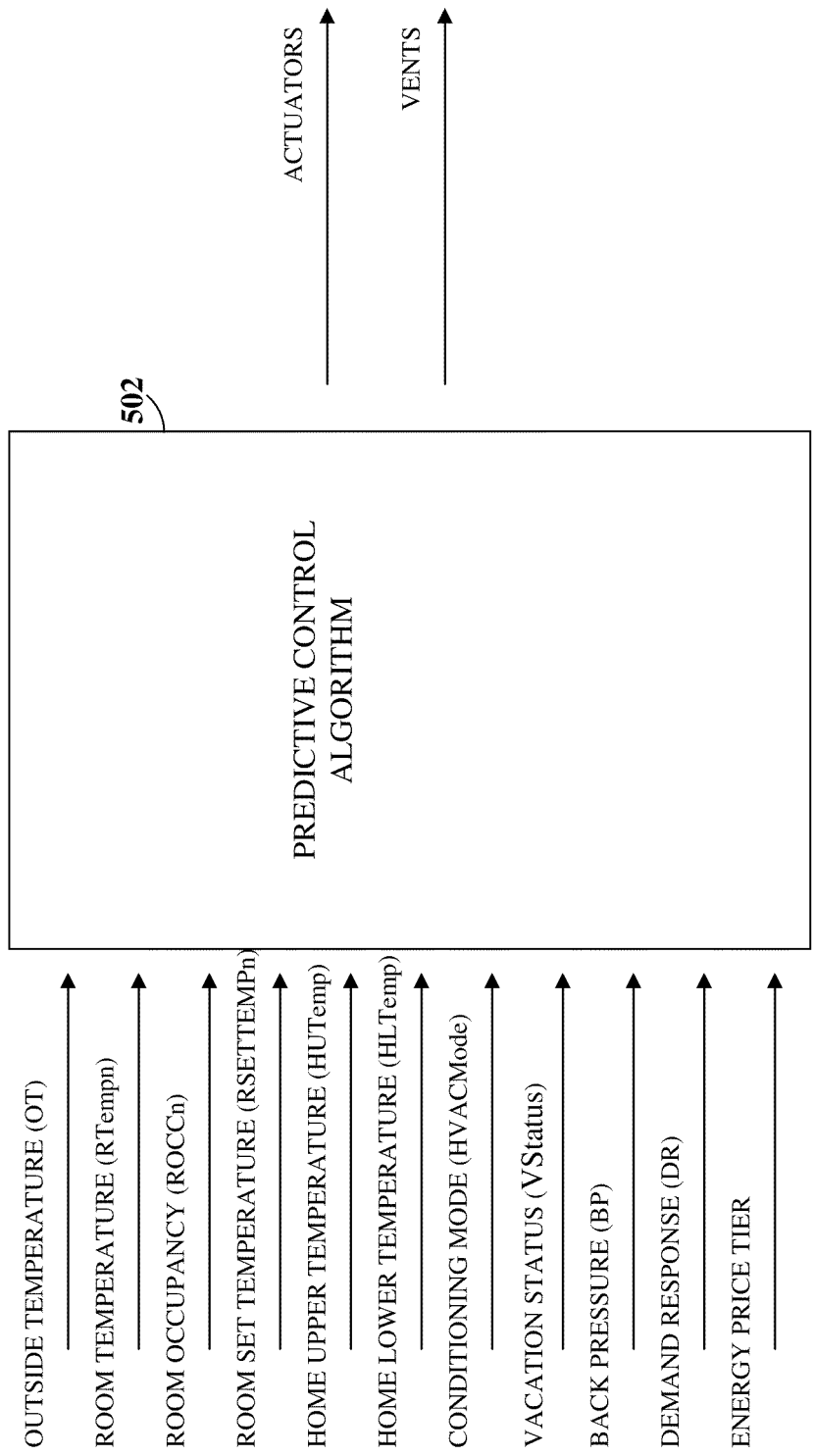
FIG. 5D exemplarily illustrates application of a predictive control algorithm using multiple inputs for controlling actuators and vents.

FIGS. 5A-5C exemplarily illustrate a flowchart comprising the steps of predictively controlling environmental conditions in multiple occupancy zones 401 in an occupancy space. The system 200 disclosed herein applies a predictive control algorithm 502 for predictively controlling environmental conditions in occupancy zones 401 of an occupancy space. The predictive control algorithm 502 accepts different inputs 501 for consideration, for example, outside temperature (OT), room temperature (RTEMPn), room occupancy (ROCCn), room set temperature (RSETTEMPn), home upper temperature (HUTemp) setting, home lower temperature (HLTemp) setting, a heating, ventilating and air conditioning mode (HVACMode), vacation status (VStatus), vacation threshold settings (VHUTemp and VLUTemp), back pressure (BP) data, a demand response (DR) signal and energy price tier from the utilities, etc. to make control decisions about opening or closing the vents 207 or actuating the furnace 402 or air conditioning unit. FIG. 5D exemplarily illustrates application of the predictive control algorithm 502 using the inputs 501 for controlling the actuators 208 and vents 207. The demand response signal from the utilities is obtained, for example, via the internet. As illustrated in FIG. 5A, the predictive control algorithm 502 determines 503 whether the heating, ventilating and air conditioning (HVAC) mode is set to operate in a heating mode 505 or a cooling mode 504.

In the heating mode 505 as illustrated in FIG. 5B, the predictive control algorithm 502 checks 506 whether the vacation mode, identified by the parameter VStatus, is enabled or disabled. If the vacation mode is enabled, the predictive control algorithm 502 checks whether the measured temperatures HUTemp and HLTemp of the occupancy zones 401 of a building space are within the user defined vacation threshold settings VHUTemp and VLUTemp 508 respectively. If the measured temperatures HUTemp and HLTemp of the occupancy zones 401 of the building space are within the user defined vacation threshold settings VHUTemp and VLUTemp, the system 200 does not condition the building space. The system 200 simultaneously identifies additional vents 207 that can be closed during the next time cycle.

In the heating mode 505, if the vacation mode is disabled, the predictive control algorithm 502 checks and compares 507 the measured room temperatures (RTEMPn) from each occupancy zone 401 against the occupancy zone's user defined set temperature (RSETTEMPn). This process identifies all the occupancy zones 401 that require additional heat. If RTEMP is less than RSETTEMPn, the predictive control algorithm 502 then identifies 510 the occupancy status (ROCCn) of the occupancy zones 401 that are requesting for additional heat. When the predictive control algorithm 502 identifies that all occupied zones are requesting for additional heat, the control module 205 sends control signals and instructions for turning on the furnace 402 and opening the vents 207 in the occupied zones. If the occupancy status shows that the occupancy zones 401 are unoccupied, the predictive control algorithm 502 then determines 512 whether the occupancy zones 401 are likely to be occupied during the next time cycle. If the occupancy zones 401 will be occupied during the next time cycle, the control module 205 sends control signals and instructions to open the vents 207. When none of the occupancy zones 401 require conditioning in the current cycle, the predictive control algorithm 502 checks the back pressure (BP) thresholds to determine the occupancy zones 401 where the vents 207 can be safely closed without compromising system performance. If the occupancy zones 401 will not be occupied during the next time cycle, the predictive control algorithm 502 compares 513 the back pressure with the maximum back pressure allowed.

If the back pressure is not greater than the maximum back pressure allowed, the control module 205 sends control signals and instructions to close the vents 207. If the back pressure is greater than the maximum back pressure allowed, the predictive control algorithm 502 determines 514 whether any of the occupancy zones 401 are pending conditioning. If any of the occupancy zones 401 are pending conditioning, the operation is suspended. If none of the occupancy zones 401 are pending conditioning, the control module 205 sends control signals and instructions to shut down the furnace 402.

In the heating mode 505, if the vacation mode is disabled and if RTEMP is not less than RSETTEMPn, the predictive control algorithm 502 determines 509 whether the back pressure is greater than the maximum back pressure allowed. If the back pressure is not greater than the maximum back pressure allowed, the control module 205 sends control signals and instructions to close the vents 207. If the back pressure is greater than the maximum back pressure allowed, the predictive control algorithm 502 determines 511 whether any of the occupancy zones 401 are pending conditioning. If any of the occupancy zones 401 are pending conditioning, the operation is suspended. If none of the occupancy zones 401 are pending conditioning, the control module 205 sends control signals and instructions to shut down the furnace 402.

In the cooling mode 504 as illustrated in FIG. 5C, the predictive control algorithm 502 checks whether the vacation mode, identified by the parameter VStatus, is enabled or disabled 515. If the vacation mode is enabled, the predictive control algorithm 502 checks whether the measured temperatures HUTemp and HLTemp of the occupancy zones 401 of the building space, are within the user defined vacation threshold settings VHUTemp and VLUTemp 517 respectively. If the measured temperatures HUTemp and HLTemp of the occupancy zones 401 of the building space are within the user defined vacation threshold settings VHUTemp and VLUTemp, the system 200 does not condition the building space. The system 200 simultaneously identifies additional vents 207 that can be closed during the next time cycle.

In the cooling mode 504, if the vacation mode is disabled, the predictive control algorithm 502 checks and compares 516 the measured room temperatures (RTEMPn) from each occupancy zone 401 against the room's user defined set temperature (RSETTEMPn). This process identifies all the occupancy zones 401 that require additional cold air. If RTEMP is greater than RSETTEMPn, the predictive control algorithm 502 then identifies 519 the occupancy status (ROCCn) of the occupancy zones 401 that are requesting for additional cold air. When the predictive control algorithm 502 identifies all occupied zones requesting for additional cold air, the control module 205 sends control signals and instructions for turning on the air conditioning (AC) unit and opening the vents 207 in the occupied zones.

If the occupancy status shows that the occupancy zones 401 are unoccupied and do not require additional conditioning, the predictive control algorithm 502 then determines 521 whether the occupancy zones 401 are likely to be occupied during the next time cycle. If the occupancy zones 401 will be occupied during the next time cycle, the control module 205 sends control signals and instructions to open the vents 207. When none of the occupancy zones 401 require conditioning in the current cycle, the predictive control algorithm 502 looks for the occupancy zones 401 with the lowest probability of occupancy and checks the back pressure (BP) thresholds to determine the occupancy zones 401 where the vents 207 can be safely closed without compromising system performance. If the occupancy zones 401 will not be occupied during the next time cycle, the predictive control algorithm 502 compares 522 the back pressure with the maximum back pressure allowed. If the back pressure is not greater than the maximum back pressure allowed, the control module 205 sends control signals and instructions to close the vents 207. If the back pressure is greater than the maximum back pressure allowed, the predictive control algorithm 502 determines 523 whether any of the occupancy zones 401 are pending conditioning. If any of the occupancy zones 401 are pending conditioning, the operation is suspended. If none of the occupancy zones 401 are pending conditioning, the control module 205 sends control signals and instructions to shut down the air conditioning unit.

If RTEMP is not greater than RSETTEMPn, the predictive control algorithm 502 determines 518 whether the back pressure is greater than the maximum back pressure allowed. If the back pressure is not greater than the maximum back pressure allowed, the control module 205 sends control signals and instructions to close the vents 207. If the back pressure is greater than the maximum back pressure allowed, the predictive control algorithm 502 determines 520 whether any of the occupancy zones 401 are pending conditioning. If any of the occupancy zones 401 are pending conditioning, the operation is suspended. If none of the occupancy zones 401 are pending conditioning, the control module 205 sends control signals and instructions to shut down the air conditioning unit.

Figure 6:
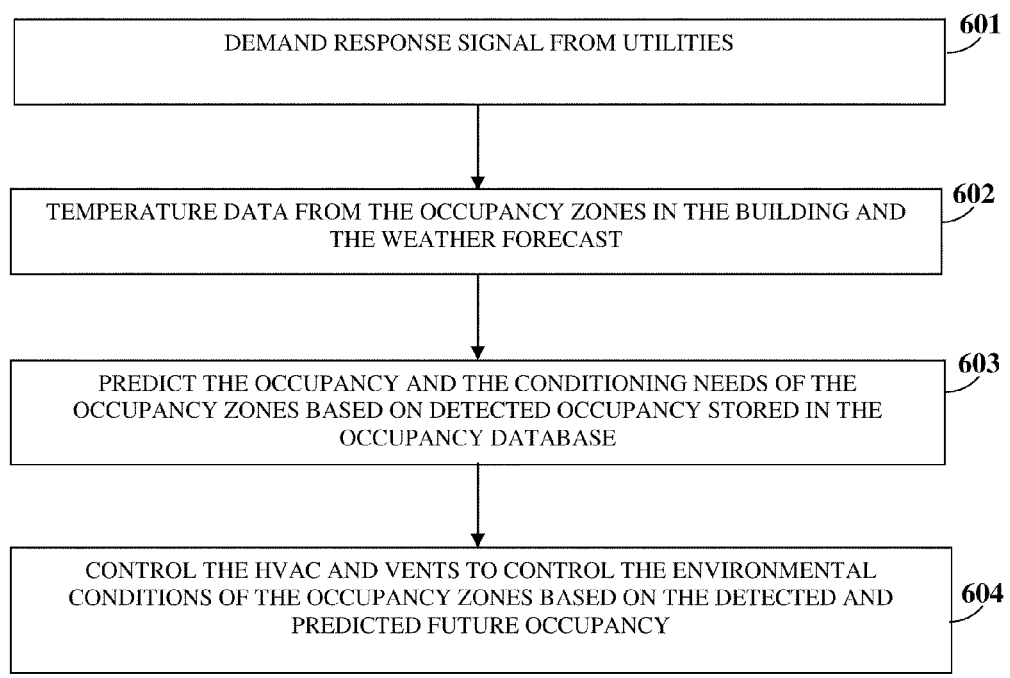
FIG. 6 exemplarily illustrates flowcharts comprising the steps of predictively controlling environmental conditions in occupancy zones based on a combination of control parameters.

FIG. 6 exemplarily illustrates a flowchart comprising the steps of predictively controlling environmental conditions in occupancy zones 401 based on a combination of control parameters, for example, the demand response signal from utilities, detected environmental external and internal conditions, predicted occupancy, etc. The predictive control algorithm 502 accepts the demand response signal 601 from the utilities. The predictive control algorithm 502 further collects temperature data 602 from the occupancy zones 401 in the building and the weather forecast. The system 200 predicts 603 the occupancy and the conditioning needs of the occupancy zones 401 based on the detected occupancy stored in the occupancy database 203. The predictive control algorithm 502 combines the demand response signal with the predicted occupancy patterns, conditioning needs, and temperature data from the occupancy zones 401 within the building and the weather forecast to make intelligent control decisions. The system 200 controls 604 the HVAC and the vents 207 to control the environmental conditions of the occupancy zones 401 based on the detected and predicted future occupancy. The unoccupied zones are over-conditioned and the air is used as thermal storage mass. The fan-only mode of HVAC is utilized to circulate the cold air in the unoccupied zones as the day progresses. For example, on a hot summer day, a demand response signal enables the pre-cooling of the building space in the early morning hours during which the electricity price tier is lower and also the efficiency to condition the building is higher. The occupancy zones 401 that are not likely to be occupied during the day can be over-cooled and the cold air can be circulated through the building throughout the remainder of the demand response period.

Figure 7:
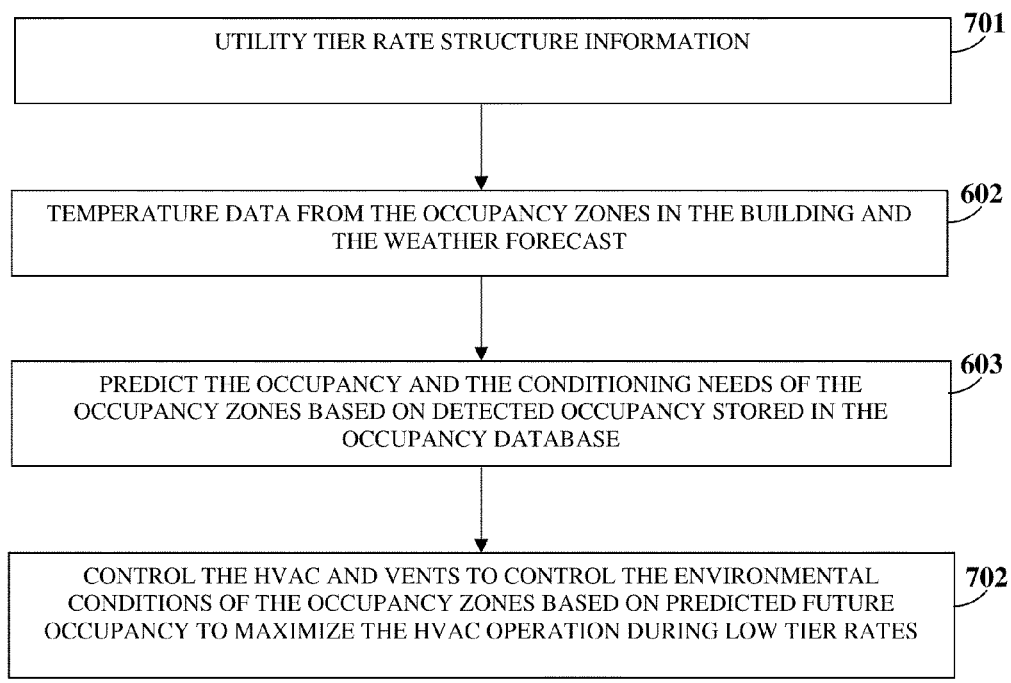
FIG. 7 exemplarily illustrates flowcharts comprising the steps of predictively controlling environmental conditions in occupancy zones based on a combination of control parameters.

FIG. 7 exemplarily illustrates a flowchart comprising the steps of predictively controlling environmental conditions in occupancy zones 401 based on a combination of control parameters, for example, the information on a utility tier rate structure, detected environmental external and internal conditions, predicted occupancy, etc. Several progressive utilities already employ tiered rate structure for energy. The predictive control algorithm 502 accepts the utility tier rate structure information 701, for example, via internet. The predictive control algorithm 502 further collects temperature data 602 from the occupancy zones 401 in the building and the weather forecast. The system 200 predicts 603 the occupancy and the conditioning needs of the occupancy zones 401 based on the detected occupancy stored in the occupancy database 203.

The predictive control algorithm 502 combines the rate information with the predicted occupancy, the conditioning needs, and the historical and future temperature data from the occupancy zones 401 for making optimal conditioning decisions while leveraging lower energy price. The system 200 controls 702 the HVAC and the vents 207 to control the environmental conditions of the occupancy zones 401 based on the detected and predicted future occupancy to maximize the HVAC operation during low tier rates.

Figure 8:
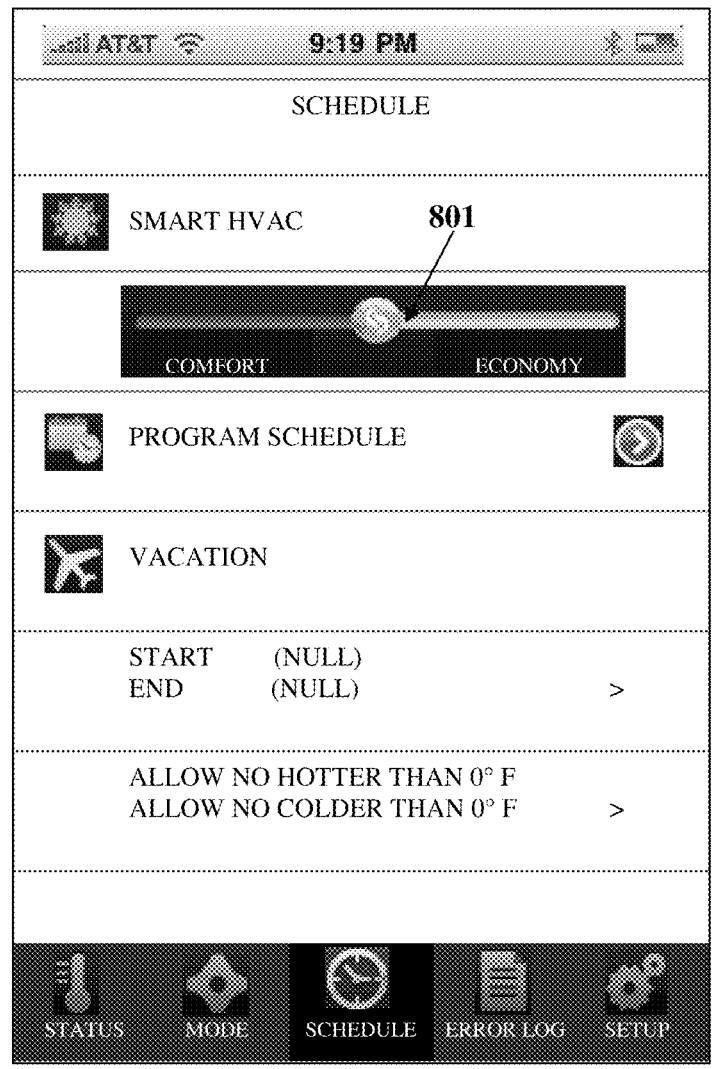
FIG. 8 exemplarily illustrates a graphical user interface for selecting different configurable modes of operation for predictively controlling environmental conditions of multiple occupancy zones.

FIG. 8 exemplarily illustrates a graphical user interface (GUI) 209 for selecting different configurable modes for predictively controlling environment conditions in the occupancy zones 401. A slider component 801 is provided on the GUI 209 for enabling a user to select different configurable modes, for example, a comfort mode and an economy mode. The comfort mode controls the environmental conditions in all occupancy zones irrespective of the occupancy, while the economy mode conditions the occupancy zones based on the predicted future occupancy. The selection of the comfort mode and the economy mode controls the effectiveness of the predictive control algorithm 502 and hence the number of occupancy zones 401 that are conditioned in advance.

Figure 9:
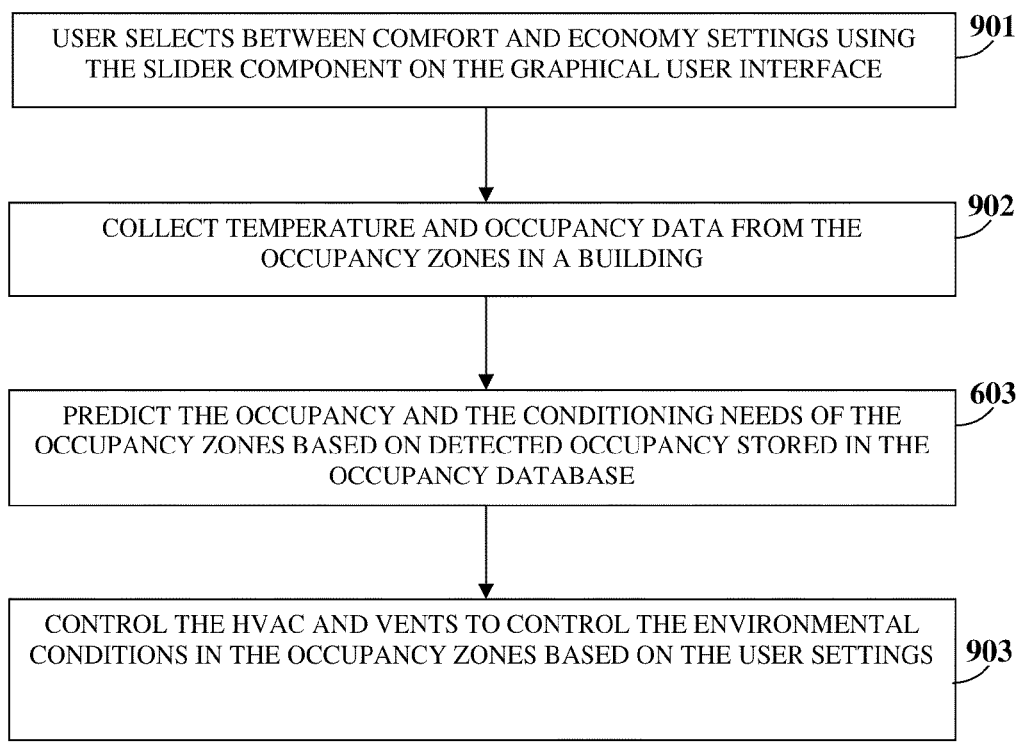
FIG. 9 exemplarily illustrates a flowchart comprising the steps of predictively controlling environmental conditions in occupancy zones in different configurable modes of operation.

FIG. 9 exemplarily illustrates a flowchart comprising the steps of predictively controlling environmental conditions in occupancy zones 401 in different configurable modes of HVAC operation, for example, the comfort mode and the economy mode. The user can select 901 the degree of comfort and efficiency using the slider component 801 on the GUI 209 as exemplarily illustrated in FIG. 8. The predictive control algorithm 502 collects 902 temperature and occupancy data from the occupancy zones 401 in a building. The system 200 predicts 603 the occupancy and the conditioning needs of the occupancy zones 401 based on the detected occupancy stored in the occupancy database 203. The predictive control algorithm 502 accepts the user settings from the GUI 209 and combines the user settings with the predicted occupancy patterns, conditioning needs, and detected occupancy and temperature data from the occupancy zones 401 within the building to make intelligent control decisions. The system 200 controls 903 the HVAC and the vents 207 to control the environmental conditions of the occupancy zones 401 based on the user settings. For example, if the system 200 is set to operate in the economy mode, the system 200 conditions only the occupancy zones 401 with a high probability of occupancy. In this case more occupancy zones 401 will be left unconditioned or minimally conditioned leading to greater savings. In the comfort mode, the system 200 maintains the building temperature within the predefined temperature set point by controlling temperature in all the occupancy zones 401, even if the probability of future occupancy is small.

Figure 10:
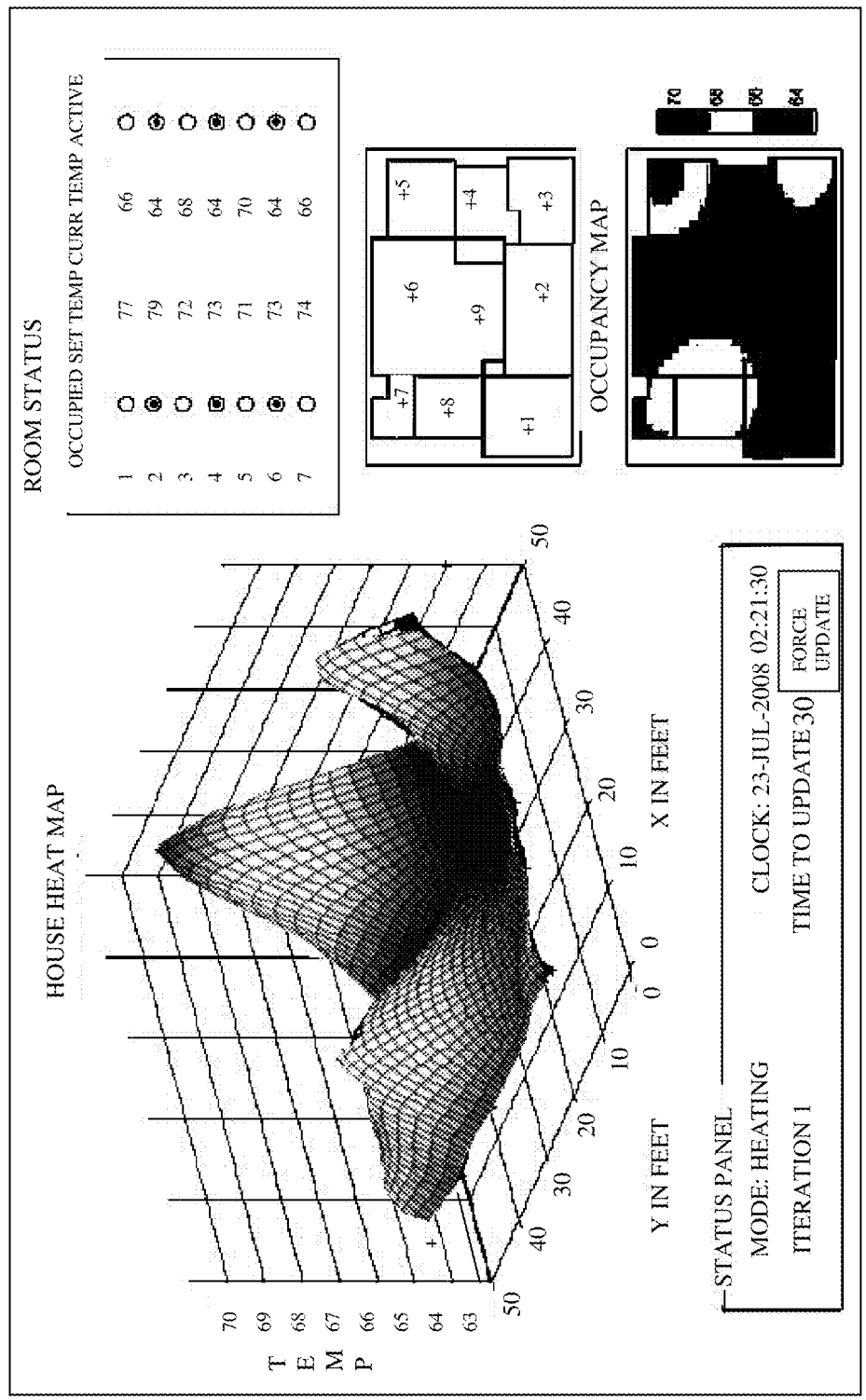
FIG. 10 exemplarily illustrates a graphical user interface displaying heat maps and occupancy maps of one or more occupancy zones in an occupancy space.

FIG. 10 exemplarily illustrates a GUI 209 displaying heat maps and occupancy maps of one or more occupancy zones 401 in an occupancy space. The GUI 209 displays controlled environmental conditions by overlaying temperature heat maps and occupancy maps on a floor plan of the occupancy space. The heat maps display temperatures of the occupancy zones 401 by mapping the temperatures using a coordinate system. The GUI 209 may display present temperatures and offset temperatures of the occupancy zones 401, as exemplarily illustrated in FIG. 11. The occupancy maps display the environmental conditions and number of instant occupants in each of the occupancy zones 401 of the occupancy space. The environmental conditions displayed on the GUI 209 comprise, for example, current temperature, set temperature, etc. The GUI 209 may also provide a status panel displaying date, time, mode, and iteration.

FIG. 11 exemplarily illustrates a GUI 209 displaying temperatures of occupancy zones 401 and setup options. The GUI 209 also provides setup options to enable control of the environmental conditions to be configured to suit the comfort levels of the occupant for different environmental conditions. The GUI 209 further provides an advanced setup option for the occupant to manually configure the environmental conditions of each of the occupancy zones 401. The advanced setup comprises, for example, an option for layout plotting of temperatures. The advanced setup further provides an option for displaying the occupancy zones 401 on a layout for easy configuration. The GUI 209 further enables the occupant to choose between one or more configurable and selectable modes of operation, for example, an economy mode and a comfort mode of the system 200 depending on the comfort level and energy savings the occupant wishes to achieve. The GUI 209 further provides an option to choose between automatic configuration and manual configuration to attain the preferred comfort levels in each of the occupancy zones 401. The GUI 209 also displays a real time graph representing energy saved by the system 200 disclosed herein.

Consider an example of a house with John and Jane living with their pet dog Spot in their house. In this example, the house is the occupancy space, the bedroom, the living room, the kitchen, and the basement are the occupancy zones 401, and John, Jane, and Spot are the animate occupants of the occupancy zones 401. The living patterns of John, Jane, and Spot are as follows: John leaves for work at 8 a.m. and returns home at 5 p.m. everyday. Jane leaves home for work at 9 a.m. and returns home at 6 p.m. everyday. John washes the dishes in the kitchen before Jane arrives. Jane cooks dinner at 7 p.m. John and Jane then watch television (TV) till they go to bed at 10 p.m. Spot stays home all day.

In winter, the house needs to be heated. John and Jane use the system 200 disclosed herein to heat their house. They define their preferred comfort levels using the GUI 209. The system 200, for example, the occupancy pattern determination module 204 uses a proprietary algorithm to determine the living patterns of the occupants John, Jane and their dog Spot. When John and Jane are away at work, the system 200 detects Spot as the only occupant of the house. The system 200 determines that Spot is a non-human animate occupant and provides minimal control or no control of the environmental conditions of the house. A few minutes before John arrives home, the system 200 starts heating the kitchen and living room of the house. When John enters the house at 5 p.m., the kitchen and living room of the house is already heated to the set temperature and comfort level, and John does not need to wait in the cold for the house to heat up. John goes to the kitchen to wash the dishes. While John is doing the dishes, the system 200 does not heat the rest of the house apart from the kitchen and living room because there are no other occupancy zones 401 that are predicted to be occupied in the near future.

When Jane arrives home at 6 p.m., the living room and the kitchen are already heated when she enters. While Jane is cooking dinner, John is reading in the living room. Hence, the system 200 predictively heats both the kitchen and the living room before occupancy by John and Jane.

After dinner, when John and Jane are watching TV in the living room, the system 200 stops heating the kitchen. Shortly before 10 p.m., the system 200 starts heating the bedroom. When John and Jane go to bed, the bedroom is already heated according to their preferences. The temperature outside the house may drop very low at night and in the early morning. The system 200 detects the drop in the outside temperature and increases heat provided to the bedroom to maintain the environmental conditions in the bedroom at the comfort levels of John and Jane. The next morning when John and Jane both leave for work, the system 200 restarts conditioning the house till a few minutes before John's arrival at 5 p.m.

John and Jane seldom enter the basement, and hence the system 200 does not condition the basement. If either John or Jane wishes to enter the basement, the system 200 will detect the occupancy in the basement and start heating the basement. In this case, there may be a period of time when John or Jane is in the basement and the temperature is not at an optimal level. Alternatively, they may manually instruct the system 200 to heat the basement using the GUI 209 before they enter the basement. Hence, John and Jane need not walk into an unconditioned room while using the system 200 disclosed herein. Furthermore, if John and Jane start going to the basement frequently, the system 200 determines the behavior and proactively heats the basement before the arrival of John and Jane. Therefore, the system 200 adapts to suit the living patterns of John and Jane without the intervention of John and Jane.

The system 200 also controls environmental conditions other than temperature, for example, humidity. Controlling other environmental conditions makes John and Jane feel comfortable even at a temperature a few degrees lower than the temperature they would have been comfortable at. By lowering the temperature, the system 200 reduces the energy consumed for conditioning the house.

It will be readily apparent that the various methods and algorithms described herein may be implemented in a computer readable medium appropriately programmed for general purpose computers and computing devices. Typically a processor, for example, one or more microprocessors will receive instructions from a memory or like device, and execute those instructions, thereby performing one or more processes defined by those instructions. Further, programs that implement such methods and algorithms may be stored and transmitted using a variety of media, for example, computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer readable programs may be implemented in any programming language. Some examples of languages that can be used include C, C++, C#, Perl, Python, or JAVA. The software programs may be stored on or in one or more mediums as an object code. A computer program product comprising computer executable instructions embodied in a computer readable medium comprises computer parsable codes for the implementation of the processes of various embodiments.

Where databases are described such as the occupancy database 203 and the thermal signature database 210, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method for predictively controlling environmental conditions of a plurality of occupancy zones in an occupancy space, comprising:
    detecting occupancy of each of said occupancy zones to determine presence of one or more occupants, comprising:
        determining a class of each of said occupants, wherein said class is one or more of an animate class, an inanimate class, a human class, or a non-human class; and
        determining a plurality of attributes of each of said occupants, wherein said attributes further define said determined class of said occupant;
    storing said detected occupancy of each of said occupancy zones in an occupancy database;
    determining patterns of occupancy of each of said occupancy zones over a predetermined duration using said occupancy database, wherein said patterns of occupancy is normalized over a predetermined number of days;
    predicting future occupancy of said occupancy zones based on said determined patterns of occupancy of said each of said occupancy zones; and
    controlling said environmental conditions of said occupancy zones in said occupancy space based on one or more of said detected occupancy, said determined class and said determined attributes of said occupants, and said predicted future occupancy.

2. The method of claim 1, wherein determining said class and said attribute of each of said occupants in each of said occupancy zones in said occupancy space comprises:
    capturing an infrared image of said occupant in each of said occupancy zones;
    digitizing infrared image information of said captured image to obtain a thermal signature of said occupant; and
    comparing said thermal signature of said occupant with thermal signatures of a plurality of occupants stored in a thermal signature database for determining said class and said attributes of said occupant.

3. The method of claim 1, further comprising controlling said environmental conditions of said occupancy space based on a plurality of present and forecast, internal and external environmental conditions and said predicted future occupancy in said occupancy zones.

4. The method of claim 3, wherein said forecast external environmental conditions comprise regional weather forecasts for short durations of time and long durations of time.

5. The method of claim 1, further comprising combining one or more of a plurality of control parameters to predictively control said environmental conditions in each of said occupancy zones.

6. The method of claim 1, further comprising displaying said controlled environmental conditions on a graphical user interface by overlaying temperature heat maps and occupancy maps on a floor plan of said occupancy space.

7. The method of claim 1, further comprising providing one or more environmental sensor motes and one or more actuators in each of said occupancy zones for detecting and predictively controlling environmental conditions in each of said occupancy zones.

8. A system for predictively controlling environmental conditions of a plurality of occupancy zones in an occupancy space, comprising:
 a plurality of occupancy sensors that detect occupancy of said occupancy zones;
 an occupancy database that stores said detected occupancy of each of said occupancy zones;
 an occupancy pattern determination module that determines patterns of occupancy of each of said occupancy zones over a predetermined duration using said occupancy database, wherein said patterns of occupancy is normalized over a predetermined number of days;
 a class and attribute determination module for determining class and a plurality of attributes of an occupant in each of said occupancy zones in said occupancy space, comprising:
  an image capture device for capturing an infrared image of said occupant in each of said occupancy zones;
  an image digitization module for digitizing infrared image information of said captured image to obtain a thermal signature of said occupant; and
  a comparison module for comparing said thermal signature of said occupant with thermal signatures of a plurality of occupants stored in a thermal signature database for determining said class and said attributes of said occupant;
 a prediction module that predicts future occupancy of said occupancy zones based on said determined patterns of occupancy of said each of said occupancy zones; and
 a control module that controls said environmental conditions of said occupancy zones in said occupancy space based on one or more of said detected occupancy and said predicted future occupancy.

9. The system of claim 8, further comprising one or more environmental sensor motes and one or more actuators in each of said occupancy zones for detecting and predictively controlling environmental conditions in each of said occupancy zones.

10. The system of claim 9, further comprising one or more modular vents in each of said occupancy zones for controlling air flow in each of said occupancy zones, wherein said control module predictively controls said modular vents through said one or more actuators.

11. The system of claim 8, wherein said occupancy sensors are based on one or more of charged coupled device sensors and complimentary metal oxide semiconductor sensors that detect occupancy using specific infrared signatures and digital image processing techniques.

12. The system of claim 8, wherein said control module predictively controls said environmental conditions of said occupancy zones based on said determined class and said determined attributes of said occupant.

13. The system of claim 8, wherein said control module predictively controls said environmental conditions of said occupancy space based on a plurality of present and forecast, internal and external environmental conditions.

14. The system of claim 8, further comprising a graphical user interface associated with said control module that displays said controlled environmental conditions by overlaying temperature heat maps and occupancy maps on a floor plan of said occupancy space.

15. The system of claim 14, wherein said graphical user interface provides one or more configurable and selectable modes of operation, wherein said one or more configurable modes comprise an economy mode and a comfort mode for said control module.

16. A computer program product comprising a non-transitory computer-readable storage medium having computer readable program code embodied thereon, said computer-readable program code comprising:
 a first computer readable program code for detecting occupancy of each of a plurality of occupancy zones in an occupancy space to determine presence of one or more occupants, said first computer readable program code further configured to:
  determine a class of each of said occupants, wherein said class is one or more of an animate class, an inanimate class, a human class, or a non-human class; and
  determine a plurality of attributes of each of said occupants, wherein said attributes further define said class of said occupants;
 a second computer readable program code for storing said detected occupancy of each of said occupancy zones in an occupancy database;
 a third computer readable program code for determining patterns of occupancy of each of said occupancy zones over a predetermined duration using said occupancy database, wherein said patterns of occupancy is normalized over a predetermined number of days;
 a fourth computer readable program code for predicting future occupancy of said occupancy zones based on said determined patterns of occupancy of said each of said occupancy zones; and
 a fifth computer readable program code for controlling environmental conditions of said occupancy zones in said occupancy space based on one or more of said detected occupancy, said determined class and said determined attributes of said occupants, and said predicted future occupancy.

17. The computer program product of claim 16, said computer-readable program code further comprises:
 a sixth computer parsable program code for capturing an infrared image of said occupant in each of said occupancy zones;
 a seventh computer parsable program code for digitizing infrared image information of said captured image to obtain a thermal signature of said occupant; and
 an eighth computer readable program code for comparing said thermal signature of said occupant with thermal signatures of a plurality of occupants stored in a thermal signature database for determining said class and said attributes of said occupant.

* * * * *